United States Patent [19]

Alon

[11] 4,064,220

[45] Dec. 20, 1977

[54] REMOVAL OF DISSOLVED ORGANIC MATTER FROM ACIDIC AQUEOUS SOLUTION

[75] Inventor: Alexander Alon, Haifa, Israel

[73] Assignee: IMI (TAMI) Institute for Research and Development, Haifa, Israel

[21] Appl. No.: 672,812

[22] Filed: Apr. 1, 1976

Related U.S. Application Data

[63] Continuation-in-part of Ser. No. 379,510, July 16, 1973, abandoned.

[30] Foreign Application Priority Data

Aug. 30, 1972 Israel ........................................ 40253

[51] Int. Cl.$^2$ ...................... C01B 25/16; C01B 17/90
[52] U.S. Cl. ............................... 423/321 R; 423/531; 210/54
[58] Field of Search ............. 423/321 R, 531; 210/54; 260/51.5

[56] References Cited

U.S. PATENT DOCUMENTS

| T932,002 | 3/1975 | McCullough et al. | 423/321 |
|---|---|---|---|
| T942,007 | 1/1976 | Stinson et al. | 423/305 |
| 2,133,251 | 10/1938 | McCord | 423/321 R |
| 2,866,684 | 12/1958 | Colwell | 423/531 |
| 3,226,318 | 12/1965 | Schick | 210/10 |
| 3,634,230 | 1/1972 | Odom et al. | 210/54 R |
| 3,869,387 | 3/1975 | Vargiu et al. | 210/59 |
| 3,967,948 | 7/1976 | McCullough | 423/321 R |

FOREIGN PATENT DOCUMENTS

| 316,648 | 12/1971 | U.S.S.R. | 423/531 |

OTHER PUBLICATIONS

Chem. Abstracts-vol. 81-1974-65709e.
Chem. Abstracts-vol. 82-1975-174950t.

Primary Examiner—O. R. Vertiz
Assistant Examiner—Eugene T. Wheelock
Attorney, Agent, or Firm—Ladas, Parry, Von Gehr, Goldsmith & Deschamps

[57] ABSTRACT

An aqueous solution of a mineral acid is freed of dissolved or colloidally dispersed organic matter by admixing to the solution an aldehyde or an aldehyde oligomer and a compound copolymerizable with an aldehyde, allowing a polymerization reaction to occur and separating the resulting polymer. The polymer that forms removes selectively from the solution the said organic matter and any suspended organic matter is also removed. The aldehyde and the compound copolymerizable therewith may be added in the form of a pre-condensate.

12 Claims, No Drawings

REMOVAL OF DISSOLVED ORGANIC MATTER FROM ACIDIC AQUEOUS SOLUTION

This application is a continuation-in-part of Ser. No. 379,510, filed 7-16-73, now abandoned.

The present invention concerns the selective removal of dissolved organic matter from aqueous solutions of mineral acids such as phosphoric acid and sulfuric acid solutions. The organic matter may be present in the aqueous solutions in a dissolved state or colloidal state, and both states are deemed to be covered by the description "dissolved organic matter".

The invention also provides for the removal of non-dissolved, dispersed matter from aqueous solutions of mineral acids. However, as a rule, the removal of dispersed matter will in accordance with the invention only be incidental to the removal of dissolved organic matter.

The invention is applicable with particular advantage to aqueous mineral acid solutions wherein the acid concentration is at least one molar.

In many industrial processes acidic liquors are obtained which contain dissolved organic matter. Examples for such liquors are those obtained upon acid leaching of ore concentrates, such as organic ores, ilmenite, etc. Some times the acidic liquors contain in addition to dissolved organic matter, dispersed organic substances. Examples of such liquors are "wet process" phosphoric acid, spent sulfuric acid (from various organic processes) etc. The dissolved and dispersed organic matter is not only inherently undesirable but, in addition, causes difficulties in handling separation and various processing operations.

For example, crude phosphoric acid, e.g. wet process phosphoric acid contains dissolved and finely divided organic impurities. These impurities which derive mainly from the phosphate rock, appear to be — at least partly — in colloidal solution, and to a certain extent also in fine dispersion, and cause the phosphoric acid to have a dark or even a black colour. The organic impurities also give rise to various problems such as high viscosity, plugging of equipment, clogging of filters, deposition of sludge, foaming, etc. Moreover, the presence of the organic impurities is also undesirable, in various applications of the phosphoric acid, such as the manufacture of polyphosphate.

It is an object of this invention to provide a simple and inexpensive method of removing undesirable dissolved organic matter from various aqueous mineral acid solutions, in particular such in which the acid concentration is at least one molar, thereby to render such solutions more suitable for their designated use and to facilitate their handling, separation and further processing.

One important application of the present invention relates to a method of purifying or clarifying phosphoric acid, and in particular phosphoric acid produced by the so-called wet process, by removal therefrom of dissolved organic matter as well as dispersed organic and inorganic impurities. The method of the invention may, among others, be applied directly to reactive mixture, e.g. a phosphoric acid/calcium sulfate slurry obtained by the decomposition of rock phosphate with sulfuric acid, or to the liquor remaining after separation of coarse solid matter by conventional mechanical separation methods.

Another important application of the present invention is the purification of spent sulfuric acid containing organic impurities, e.g. spent sulfuric acid obtained in the production of alcohols by sulfation of olefines, or sulfuric acid obtained in the de-aromatization of petroleum fractions.

Organic matter in phosphoric acid originates from the rock phosphate. One known method for minimizing organic impurities in wet process phosphoric acid is to calcine the phosphate rock prior to its digestion with sulfuric acid. Other well known methods consist in treating the wet process acid with activated carbon, filtering it through active clays or carrying out destructive oxidation. These treatments are all rather expensive or of limited efficiency. A more recent method described, for example, in U.K. Patent Specification No. 1,113,922, is to treat the slurry obtained upon sulfuric acid decomposition of the rock phosphate with flocculating agents. This method has been applied only on a limited scale due to the difficulty of obtaining consistently good results in plant operation. Furthermore, flocculation is sensitive to agitation, pumping, etc., since deflocculation and redispersion may occur, counteracting the effect of the flocculating agent. In any event, flocculation agents inherently act only on dispersed solids and not on dissolved matter and this method is thus inadequate for the removal of dissolved organic matter from acidic aqueous solution.

Another recent method described, for example, in U.S. Pat. No. 3,619,161 is to extract the organic impurities by means of water-immiscible organic liquids. However, this method is claimed to be useful only in case of wet process phosphoric acid free from appreciable solids content.

In U.S. Pat. No. 3,226,318 there is described a method of consolidating a sewage sludge containing about 40% by weight of solids, by means of in situ polymerization of polymerizable, water-soluble monomers, and in this way the solid material and water forming the sludge are locked in the formed polymer. In other words, in accordance with this method, an a priori existing two-phase system is merely consolidated without any separation of the phases. The disclosure does not concern the removal of dissolved organic matter from a one-phase system being in the form of an acidic aqueous solution.

In German Patent publication (Offenlegungsschrift) No. 1,920,590 there is described a method of flocculating dispersed solid material in a liquid medium comprising adding to said medium a first polymer which polymer is branched, has a high affinity to the dispersed material, comprises a plurality of reactive sites and is soluble in said medium, and a second, polyfunctional polymer acting as cross-linked agent for said first polymer. The two polymers react with each other to form a three-dimensional structure which occludes and thereby flocculates the dispersed material. The molecular weight of the second, cross-linking polymer should be from 100,000 to 10,000,000 and it is said in the specification that a low molecular weight cross-linking agent produces a slimy product which is difficult to separate. The second polymer may be formed in situ from monomers. These monomers are, however, not grafted on the first polymer but rather polymerize to form a second, high molecular polymer which latter then reacts with the first polymer as specified. This disclosure is thus concerned with the separation of a solid phase from a liquid phase in an a priori existing two-phase system, by the interaction of two distinct polymeric species, and is not concerned with the selective removal of dissolved organic matter from an aqueous acidic solution.

From U.S. Pat. No. 3,643,230 it is known to remove from waste water inorganic and organic contaminants, including phosphate salts, by treating the waste water with an anionic alkali solubilized phenolaldehyde resin. In the course of the treatment the solubilized resin is converted into an insoluble state with manifests itself by the formation of flocs in the system being treated. These flocs adsorb and/or absorb physically dissolved compounds in much the same manner as activated charcoal. This process does thus not discriminate between inorganic and organic solutes and is obviously unsuitable for freeing crude phosphoric acid from organic contaminants since phosphoric acid would also be removed.

In accordance with the invention there is provided a process for the removal of dissolved organic matter from an aqueous mineral acid solution, comprising adding to said solution a first, water-soluble compound being an aldehyde or an oligomer thereof and a second compound capable of polymerizing together with said first compound under acidic conditions, or a precondensate of said first and second compounds which precondensate is capable of further polymerization under acidic conditions, allowing a polymerization reaction to occur to form a polymer insoluble in said mineral acid solution, and recovering a refined mineral acid solution from the resulting mixture.

Preferably concentration of the aqueous mineral acid solution is at least one molar.

The aqueous mineral acids processed in accordance with the invention contain predominantly inorganic matter and the organic matter is in the nature of undesired impurities that have to be removed.

The recovery of a refined aqueous mineral acid solution, e.g. phosphoric or sulfuric acid, may be effected, for example, by physical separation from the solid phase, e.g. by decantation, filtration, centrifugation etc. It is also possible to subject the mixture of the refined aqueous mineral acid solution and solid phase to extraction with an organic solvent of limited water miscibility, to be followed by recovery of a refined aqueous mineral acid solution from the resulting extract. This latter operation is in particular suitable in the case of phosphoric acid.

Said first and second compounds may be added to the aqueous acidic solution separately, either simultaneously or successively. Alternatively it is also possible to react said first and second compounds with each other prior to their addition to the solution, to form a precondensate capable of further condensation under acidic conditions. The precondensate is then added to the solution for further polymerization, if desired, together with some further quantity of said first and/or second compounds.

The precipitating polymer selectively removes from the solution dissolved organic matter while the dissolved mineral acid is not affected. It should be noted that in accordance with the invention only one single polymer is formed, as distinct from the cross-linked system formed from two different polymers in accordance with German Patent Publication No. 1,920,590.

The invention is also distinguished from the disclosure in U.S. Pat. No. 3,634,230 in that polymerization occurs in situ as distinct from the use of a ready made polymer in accordance with the U.S. patent. Furthermore, although the U.S. patent refers to operation in solutions of pH less than 7, i.e., solutions which are acidic, yet it refers in all cases to salts, thus differing from the present invention which deals with strongly acidic solutions. Furthermore, the U.S. patent claims the removal of phosphates themselves, which would strongly defeat the purpose of the present invention which, in its application to phosphoric acid aims at removing minor organic contaminants from the major phosphoric acid ambient.

The mechanism by which the invention operates is not fully understood. It was, however, unexpected and surprising to find in accordance with the invention that by in situ polymerization of said first and second compounds to produce a single, insoluble product, dissolved organic material is selectively removed from an aqueous mineral acid solution. Such an effect was not predictable from any of the literature.

When the starting solution contains in addition to the dissolved organic matter also dispersed matter, such matter is also removed by proceeding in accordance with the invention. This feature of the invention constitutes a significant advantage as it enables to free mineral acid, e.g. phosphoric or sulfuric acid both of dissolved organic matter and suspended and otherwise dispersed impurities, in one single operation.

The invention is also applicable to mixtures of two or more mineral acids, e.g. phosphoric- hydrochloric acid, phosphoric- sulfuric acid, etc.

In the field of phosphoric acid the invention is applicable to any type of phosphoric acid irrespective of prevenance and degree of purity. Thus crude wet process phosphoric acid, phosphoric acid obtained by hydrochloric or nitric acid decomposition of rock phosphates as well as cleaned phosphoric acid containing organic solutes may be treated in accordance with the invention.

The polymerization that occurs in situ in accordance with the invention is an acid-catalyzed condensation polymerization which involves reaction of a protonated monomer, such as the condensation polymerization of a phenol with an aldehyde, which is believed to involve an electrophilic substitution which depends on the protonation of the aldehyde.

The following are a few examples of systems of polymerizable compounds that may be employed in carrying out the method according to the invention:

mono- and poly-hydroxybenzenes and alkyl substituted mono- and poly-hydroxybenzenes, such as phenol, resorcinol, cresols, xylenols, p-tertbutylphenol and p-phenylphenol in combination with aldehydes such as formaldehyde, acetaldehyde and furfuraldehyde; "amino" monomers as, for example, urea and melamine, in combination with aldehydes such as formaldehyde, acetaldehyde and furfuraldehyde.

When the aldehyde is formaldehyde it can be used in pure form or as a solution. It is also possible to use substances capable of liberating formaldehyde, such as, for example, paraformaldehyde and hexamethylenetetramine.

A preferred group of second compounds is the group of phenols having at least two unsubstituted ring positions.

The above examples should not be considered as limiting the invention in any way.

The choice for the appropriate polymerizable compounds will depend on the specific acid to be treated and the conditions under which the in situ polymerization will be required to take place (e.g. the temperature, the acid concentration, the amounts of dispersed and dissolved materials, etc.).

As mentioned above, the present invention applies to many acidic liquors. The following are of special interest:

wet process phosphoric acid liquors resulting from the decomposition of rock phosphate with hydrochloric or nitric acid the liquor obtained by leaching copper ores with sulfuric acid the liquor obtained by leaching ilmenite with sulfuric acid the liquor obtained by leaching uranium containing ores with sulfuric acid spent sulfuric acid containing organic impurities e.g. spent sulfuric acid obtained in the production of alcohols by the sulphation of olefins, de-aromatization of petroleum fractions etc.

In its application to the purification of wet process phosphoric acid the process according to the invention can be carried out in various ways such as:

a. Adding the polymerizable compounds at any convenient point in the rock attack system, or directly to the posphoric acid/calcium sulphate slurry obtained by decomposition of rock phosphate with sulfuric acid, effecting their polymerization and filtering the polymerization product along with the $CaSO_4$ in the normal way;

b. adding the polymerizable compounds to an approximately 30% by wt. $P_2O_5$ wet process phosphoric acid (obtained by filtration on the above mentioned slurry), effecting their polymerization and separating the resulting solid matter;

c. adding the polymerizable compounds to a concentrated wet process phosphoric acid (50 - 55% by wt. $P_2O_5$) prior to its cleaning and/or purification by centrifugation, decantation, filtration or solvent extraction.

The amounts of polymerizable compounds added may vary, and depend, among others, as the nature of the acid and the process parameters, but as a rule the relative amounts are small. In case of wet process phosphoric acid the convenient amounts of the polymerizable compounds are in the range of 50g to 10kg, per ton of acidic liquor. The reaction conditions (temperature, agitation, etc.) of the in situ polymerization may be varied in accordance with the monomers used and the nature of the acid.

In case of phenols and formaldehyde as polymerizable compounds the convenient temperature is from ambient to 100° C but higher temperatures can also be employed. Agitation does not adversely affect the separation in accordance with the invention, as distinguished from cases where flocculants are used in accordance with known processes.

It has been found that in consequence of the treatment of phosphoric acid according to the invention the viscosity of the acid is reduced and its sedimentation capacity upon admixture with organic solvents is improved. This is of great value when the acid is to be subsequently further purified by organic solvent extraction. This constitutes a further significant advantage over the prior art.

The invention is illustrated by the following Examples to which it is not limited.

EXAMPLE 1

1000 g of blackish-brown technical phosphoric acid, containing 54% by wt. $P_2O_5$, were heated to 70° C. 2 g of aqueous solution, containing 19.5% by wt. of phenol and 15.5% by wt. of formaldehyde were added to the phosphoric acid. After a few minutes agglomeration of the black organic material occured.

By centrifuging the liquid, a clear greenish aqueous acid separated from a black layer, containing the organic impurities.

EXAMPLE 2

3000 g of wet process phosphoric acid containing 52% by wt. of $P_2O_5$ and having a blackish colour was agitated at room temperature with 15 g of aqueous solution containing 31.8% by wt. of sodium phenolate and 8.2% by wt. of formaldehyde.

After a period of sixteen hours the mixture was separated into two layers — a clear greenish layer of phosphoric acid, and a black layer containing the organic impurities — which were separated by decantation.

EXAMPLE 3

A slurry of calcium sulphate and aqueous phosphoric acid containing 38% by wt. of $CaSO_4$ and 18.6% by wt. of $P_2O_5$ derived from the acidulation of uncalcined rock phosphate with sulphuric acid was heated to 75° C. An aqueous phenol-formaldehyde solution containing 21.4% by weight of phenol and 13.6% by wt. of formaldehyde was added to the slurry in an amount equal to 0.05% by wt. of the slurry. The slurry was kept at 72°-80° C under mechanical agitation for a period of two hours and then filtered. 3 kg of the filtrate, 300 g of powdered rock phosphate, 290 g sulphuric acid and 290 g of water were mixed together. To the slurry thus obtained, a second 1.5 g portion of aqueous phenol-formaldehyde solution as had been used before, was added. The slurry was kept under agitation for two hours at 75° C and then filtered. The whole operation, which included the stages of adding phosphate rock, sulphuric acid and water to the filtrate, adding phenol-formaldehyde solution to the slurry, and filtering the slurry, was repeated altogether nine times. The last filtrate was of a lighter colour when compared with the last filtrate from a parallel experiment carried out without the addition of phenol-formaldehyde solution. When the respective last filtrates were concentrated to 54% by wt. of $P_2O_5$ at 90° C under vacuum, the concentrate originating from the phenol-formaldehyde treated slurry was of light brown colour, while the other, was black.

EXAMPLE 4

500 ml of an aqueous solution were prepared containing 94 g of phenol, 81 g of formaldehyde and 60 g of urea. The pH of the solution was adjusted with NaOH to 8.

5 ml of this solution were mixed into 1000 g of a technical black phosphoric acid containing 54% by wt. of $P_2O_5$ and the mixture was heated to 80° C. After 15 minutes, separation of black organic material was observed. It was separated from the acid by filtration.

EXAMPLE 5

500 ml of an aqueous solution were prepared containing 108 g of cresol, 40 g of NaOH and 25 g of formaldehyde. 5 ml of this solution were mixed at 85° C with 1000 g of blackish-brown technical phopshoric acid containing 54% by weight $P_2O_5$. After thirty minutes, the liquid was centrifuged, and a clear green phosphoric acid was obtained.

EXAMPLE 6

To 1000 g of concentrated sulfuric acid, strongly discoloured — almost black — by contamination of cellulosic material, 2 ml of 37% by weight formaldehyde solution and 1 g of resorcinol were added at ambient temperature. The liquor became turbid at first, and after a few minutes distinct solid particles appeared. The acid was then filtered and a clear, light yellow liquid was obtained indicating substantial removal of the caramellized cellulosic material.

EXAMPLE 7

To 1000 g of black wet process phosphoric acid containing 50% by wt. $P_2O_5$ obtained from an uncalcined Florida phosphate rock, 6 g of an aqueous solution containing 9.4% by wt. phenol, and 4.7% by wt. of hexamethylenetetramine were added at ambient temperature. The mixture was heated to 70° C and kept at this temperature for 60 minutes. Agglomeration of black organic solid material occurred. The treated phosphoric acid was cooled and mixed with 600 g of di-isopropyl ether at 5° C for 10 minutes. Then the mixture was allowed to separate into two phases: a top-solvent phase containing purified phosphoric acid and a bottom-aqueous phase containing residual phosphoric acid, black organic solid agglomerates and other impurities originally existing in the feed acid. The separated solvent phase was heated to 30° C and simultaneously was mixed with 40 g water whereby phase separation was achieved. The top phase consisted of substantially pure solvent and the bottom phase consisted of approximately 700 g of purified phosphoric acid having light amber colour and a concentration of approximately 45% by wt. $P_2O_5$.

A parallel experiment was carried out in which the feed phosphoric acid was not treated with the reagent aqueous solution containing phenol and hexamethylenetetramine. The purified phosphoric acid thus obtained was of brownish colour which only by dilution with a twofold volume of colourless pure phosphoric acid containing 45% $P_2O_5$, gave a light amber colour identical to the colour obtained in the first experiment.

EXAMPLE 8

500 ml of an aqueous solution containing 50 g of phenol, 40 g of formaldehyde and 20 g of NaOH, was prepared by mixing phenol with 37% by wt. of formaldehyde, adding the required amount of NaOH in form of a 20% by wt. aqueous solution and adding distilled water. During the entire operation the temperature was kept below 60° C.

5 ml of this solution were mixed into 1000 g of a filter acid, containing 28% by wt. of $P_2O_5$, and obtained by sulphuric acid attack on an uncalcined Florida Phosphate Rock. This mixture was heated to 75° C and kept at this temperature for 30 minutes. The treated acid was filtered and concentrated under vacuum at about 80° C, to 54% by wt. $P_2O_5$. The concentrated acid was permitted to settle overnight, the supernatant liquor was decanted, and its kinematic viscosity measured with an Ostwald viscosimeter at 40° C, 50° C and 60° C respectively.

Parallel comparative kinematic viscosity measurements were carried out on a concentrated product made from the untreated filter acid. The following results were obtained:

| Temp. | Treated acid | Untreated acid |
| --- | --- | --- |
| 40° C | 30.0 centistokes | 42.5 centistokes |
| 50° C | 19.4 centistokes | 31.0 centistokes |
| 60° C | 15.0 centistokes | 19.8 centistokes |

The decrease in viscosity of concentrated product after treatment shows that impurities which increase viscosity were removed by the treatment with the reagent on the filter acid.

EXAMPLE 9

10 ml of an aqueous phenol-formaldehyde-NaOH reagent described in Example 8, were added to a slurry of 1000 g of Arad Phosphate Rock (−20 mesh) in 1000 ml of water. To this slurry 2000 g of 34% hydrochloric acid were added and the temp. was kept at 80°–85° C for 30 minutes while stirring.

A parallel comparative experiment was made without adding phenol-formaldehyde-NaOH reagent.

Settling measurements were carried out with both acidulated slurries. 200 ml of each slurry were introduced into a 1000 ml graduated cylinder and allowed to settle.

The results were as follows:

|  | Blank acidulated slurry | Acidulated slurry with added reagent |
| --- | --- | --- |
| Total liquid depth | 65 mm | 65 mm |
| Depth of clarified liquor (after 20 minutes): | 1–2 mm | 25 mm |
| Colour of clarified liquor (after 180 minutes): | Brownish-yellow | Greenish-yellow |

100 ml of the supernatant liquor were then taken from each graduated cylinder, mixed with 200 ml of iso-amyl alcohol in a 500 ml separating funnel and the phases allowed to separate. The following phenomena were observed:

|  | Blank liquor | Treated liquor |
| --- | --- | --- |
| Interface: | Brown flocky precipitate | slight white precipitate |
| Colour of Solvent layer: | Brownish-yellow | Greenish-yellow |

This example shows that the removal of organics aids sedimentation, and that the clarified solution does not lead to "crud" formation at the interface in liquid-liquid extraction.

EXAMPLE 10

1,000 ml of a viscous black acid waste from a refinery treatment containing ∼ 44% by wt. $H_2SO_4$ were diluted with 1,500 ml of purified 44% by wt. $H_2SO_4$ from a prior test. 10 ml of the phenol-formaldehyde NaOH reagent described in Example 8 were added to 1,000 ml of the diluted acid tar, and the mixture was heated to 70° C and agitated for 2 minutes.

When the agitation was stopped the mixture was seen to separate rapidly into an upper flocky organic phase and a lower light brown aqueous phase. The lower aqueous phase was concentrated to ∼ 60% by wt. $H_2SO_4$ which on being treated with active earth yielded a water white product.

For comparison, a second 1,000 ml batch of the diluted acid tar was agitated for 2 minutes without addition of reagent, then allowed to stand. Phase separation into an upper black organic phase and a lower dark brown aqueous phase was very slow, requiring more than 36 hours.

The lower aqueous phase on being treated for cleaning with active earth yielded a brown product, even though the aqueous phase was not concentrated.

For further comparison a third 1,000 ml batch of the diluted acid was admixed with 10 ml of the resin prepared in accordance with Example 1 of U.S. Pat. No. 3,634,230 (Odom) and no improvement could be observed as compared to the second test in which no reagent at all was used.

EXAMPLE 11

Continuous Bench-Scale Operation

A bench-scale unit for producing wet process acid was set up comprising, a two-stage reactor, the working volume of the first reactor being 13 liters and of the second reactor being 15 liters.

1,000 g/hr of ground uncalcined Florida rock phosphate containing about 30% by wt. $P_2O_5$, was fed to the first reactor via a rotating disc feeder.

Simultaneously, the second reactor was fed with 50% by wt. $H_2SO_4$ (d $\simeq$ 1.4 g/ml) at a rate of 1,150 ml/hr, and with recycle acid (d $\simeq$ 1.2 g/ml) at a rate of 3,150 ml/hr.

The two reactors were connected in such a way as to permit internal recycle, giving an average holding time of 7 hours. Reaction temperature was maintained at 70°–72° C by means of a thermostated oil jacket.

The gypsum/phosphoric acid slurry from the reaction (d $\simeq$ 1.4 g/ml) was discharged continuously at a rate of 3,650 ml/hr into a filter feed tank, also enclosed in the thermostated oil jacket. This slurry was filtered batchwise in three countercurrent stages. Product filter acid containing $\simeq$ 29% $P_2O_5$ was thus produced at a rate of 1,750 ml/hr. The wash waters, and a part of diluted product as required were recycled to the reaction.

The whole test was continued until steady state was reached and a product of constant composition was produced and collected.

At this time, a start was made to feed 10 ml/hr of phenol-formaldehyde-NaOH reagent described in Example 8, into the first reactor. This part of the test too was continued until steady state was reached and a sufficient quantity of treated product of constant composition was collected.

Samples of filter acid from both runs, i.e., treated and untreated, were concentrated to 54% by wt. $P_2O_5$ and measurements made of colour, viscosity and clarification on the filter acids and on the concentrated products. The results were as follows:

| Filter acid (29% $P_2O_5$) | Untreated Acid | Treated Acid |
|---|---|---|
| Colour | Yellow with brownish tint | Light yellow with greenish tint |
| Colour intensity- | Taken as | |
| a. Visual, by dilution technique. | 100 | 50 |
| b. By Photometer | 25 | 15 |
| | | |
| Concentrated acid (54% $P_2O_5$) | Untreated Acid | Treated Acid |
| Colour | Blackish-dark brown | Light brown-greenish tint |
| Colour intensity - Visual, by dilution technique | 100 | 40–50 |
| Viscosity at 21° C | 56 centistokes | 27 centistokes |
| at 27° C | 33 centistokes | 18 centistokes |
| at 60° C | 14 centistokes | 8 centistokes |
| Clarification (24 hours) Sediment | 11.8 ml/100 ml loose, dark coloured | 6 ml/100 ml well compacted off white colour. |

EXAMPLE 12

Tests were run according to Examples 4, 5, 6 and 7 of the U.S. Pat. No. 3,634,230 (Odom) in which the contaminants were present in 52% aqueous phosphoric acid solutions instead of aqueous solutions. In the test according to Odom's Example 4 (with alkyl benzene sulfonate) and the test according to Odom's Example 5 (with methylene blue) a slight cloudiness appeared but no coagulation. In the test according to Odom's Example 6 (lead chromate) no cloudiness appeared and the reagent was evidently consumed by the chromate. In the test according to Odom's Example 7 (with Uranium) no cloudiness appeared.

A portion of the treated solution from the test according to Odom's Example 5 was filtered and compared spectro-photometrically with the original untreated solution, giving readings only about 20% lower than the original solution. A further portion of the treated solution was heated, filtered and also compared spectro-photometrically with the original solution, giving a reading of about 40% lower than the original solution.

When the same original solution was treated with a phenol-formaldehyde-NaOH reagent prepared as described in Example 7 hereinbefore, and filtered, the resultant solution had only 3% of the original reading, i.e., better than 90% lower than the original solution.

EXAMPLE 13

U.S. Pat. No. 3,433,592 describes a process for purifying wet process phosphoric acid by means of solvent extraction, in a chloride cycle.

In some cases, when the wet process acid contains relatively high concentrations of organic matter, difficulties occur in phase separation in the liquid-liquid extraction due to accumulation of crud in the interface. Moreover, the purified concentrated product from such an acid will be relatively brown in colour. Therefore, it is desirous in these cases to remove the organic matter prior to extraction.

To 4,330 ml of black wet process phosphoric acid containing 53% by wt. $P_2O_5$ obtained from uncalcined Florida phosphate rock, 2,400 ml of 20% by wt. HCl were added; the mixture was heated to 60° C and 2,700 ml of an aqueous solution of 40% by wt. $CaCl_2$ were added slowly with agitation. Then 170 ml of an aqueous phenol-formaldehyde-NaOH reagent described in Example 7 were added, and the mixture maintained at 60° C for a further 2 hours, under continuous agitation. The mixture was filtered hot, giving a pale-brown filtrate. This was purified in accordance with the process described in U.S. Pat. No. 3,433,592 yielding a pale-yellow concentrated phosphoric acid.

When a parallel experiment was carried out without treating the wet process phosphoric acid with phenol-formaldehyde-NaOH reagent, a much darker brown filtrate was obtained, which on being purified in accordance with the process described in U.S. Pat. No.

3,433,592, yielded a darkish yellow-brown concentrated phosphoric acid.

I claim:

1. A process for the purification of an aqueous mineral acid solution containing dissolved organic matter, comprising adding to said solution a first, water-soluble compound being an aldehyde or an oligomer thereof and a second compound capable of polymerizing together with said first compound under the strongly acidic conditions within the solution, or a precondensate of said first and second compounds which precondensate is capable of further polymerization under the strongly acidic conditions within the solution, allowing the polymerization of the said first and second compounds or the said precondensate to occur within said solution to form a polymer insoluble in said mineral acid solution which polymer forms a precipitate by coprecipitation with said organic matter, and recovering a refined mineral acid solution from the resulting mixture.

2. Process according to claim 1, wherein said aqueous mineral acid is phosphoric acid.

3. Process according to claim 1, wherein said aqueous mineral acid is sulfuric acid.

4. Process according to claim 1, wherein said solution also contains dispersed matter which is included in said precipitate by coprecipitation with said polymer.

5. Process according to claim 1, wherein said first and second compounds are added simultaneously.

6. Process according to claim 1, wherein said first and second compounds are added successively.

7. Process according to claim 1, wherein the recovery of refined mineral acid from the mixture is effected by physical separation of said precipitate from said aqueous mineral acid solution.

8. Process according to claim 1, wherein the recovery of refined mineral acid from the mixture is effected by extraction of the mixture with an organic solvent of limited miscibility with water, separation of the resulting extract and recovery of refined mineral acid therefrom.

9. Process according to claim 9, wherein said mineral acid is phosphoric acid.

10. Process according to claim 3, wherein said aqueous mineral acid is a liquor resulting from the decomposition of rock phosphate with an acid selected from the group consisting of sulfuric acid, hydrochloric acid and nitric acid.

11. Process according to claim 1, wherein said first compound is a member of the group consisting of monomeric formaldehyde and substances capable of liberating formaldehyde.

12. Process according to claim 1, wherein said second compound is a member of the group of phenols having at least two unsubstituted ring positions.

* * * * *